United States Patent Office
3,252,876
Patented May 24, 1966

3,252,876
ELECTROCHEMICAL PREPARATION OF ACYL-
OXY DERIVATIVES OF ALKYL-SUBSTITUTED
CONDENSED RING AROMATIC COMPOUNDS
William J. Koehl, Jr., Yardley, Pa., assignor to Socony
Mobil Oil Company, Inc., a corporation of New York
No Drawing. Filed Dec. 12, 1963, Ser. No. 330,001
17 Claims. (Cl. 204—59)

This invention relates to the electrochemical preparation of acyloxy derivatives of alkyl-substituted aromatic compounds having two or more condensed rings. It provides a convenient method of preparing these derivatives, which are difficult to prepare by conventional methods, and which, so far as is known, have not heretofore been prepared electrochemically. The invention is further characterized by the relatively good yields obtainable.

Among other advantages, the invention is characterized by the presence of little or no by-products, a fact which reduces waste of starting material, further contributes to the yield of desired product, and increases the ease of separation and purification of the product. Of particular interest is the flexibility of the method, according to which a variation in only one operating condition, namely, the quantity of electricity passed through the solution being electrolyzed, favors the formation of a particular derivative in greater yield than another derivative.

The derivatives are of value as intermediates for the preparation of compounds having antioxidant properties, such as alkyl-substituted naphthols, which are useful as additives to lubricating oil and other hydrocarbon fractions. Other derivatives may be useful for making polymers. One derivative, 2-methyl-1,4-naphthalenediol diacetate, known as vitamin $K_4$, is of value as an anticoagulant, and in respect of this interesting compound the invention provides a single step preparation of the same from 2-methylnaphthalene. Also, by careful partial hydrolysis of the diacetate, the 1-monoacetate may be obtained, which is a stable intermediate useful for preparing vitamin $K_1$.

The invention comprises electrolyzing an anhydrous solution of the alkyl-substituted condensed ring aromatic compound, an alkanoic acid, an alkali metal salt of the latter, and the anhydride of the acid by passing current from an anode to a cathode immersed in the solution under the conditions herein described to produce an acyloxy derivative of the aromatic compound and recovering the same.

In more detail, the alkyl-substituted condensed ring aromatic compound includes compounds having only 6-membered rings, and also compounds having both 6- and 5-membered rings. Illustrative 6-membered ring compounds are the alkyl-substituted naphthalenes, acenaphthenes, anthracenes, phenanthrenes, perylenes, pyrenes, chrysenes, triphenylenes, pentacenes, fluoroanthrenes, and the like. Compounds having a 5-membered ring include the various alkyl-substituted indenes, hydrindenes, etc. Also suitable are compounds containing 5- and 6-membered rings in which a 6-membered ring may be heterocyclic, as in the alkyl-substituted quinolines, isoquinolines, dibenzofurans, dibenzopyridines, phenanthridines, phenanthrolines, phenazines; or in which a 5-membered ring may be heterocyclic, as in alkyl-substituted coumarones and thianaphthenes, etc. Other alkyl-substituted compounds are those containing the cyclopentanophenanthrene nucleus.

The aromatic compound may have one, two, or more alkyl substituents, each of any suitable length, and comprising either straight or branched chain radicals. Preferably the alkyl substituent has up to about 10 or 12, and more preferably up to 6, carbon atoms.

Suitable alkanoic acids are the C-2 to C-10 acids, and preferably the C-2 to C-6 acids such as acetic, propionic, butanoic and pentanoic and their isomers, and the various hexanoic acids. Branched as well as straight chain acids are useful, including such acids as 2-methylbutyric, 3-methylbutyric, and trimethylacetic. It is preferred to use the acid in an anhydrous state.

The alkali metal salt of the acid is preferably a salt of the acid that is present and preferably too is the sodium or potassium salt, although lithium and quaternary ammonium salts are suitable. It will be understood that the salt may be added per se to the solution or formed in situ as by addition of a base like KOH, NaOH, etc. and reaction of the latter with part of the free carboxylic acid.

The acid anhydride to be used is preferably that of the alkanoic acid which is present. As indicated, the solution to be electrolyzed is an anhydrous one, it being considered that such a solution helps to reduce the formation of by-products. The acid anhydride helps maintain the anhydrous state of the solution. Use of the anhydride in this way is convenient, but it may be omitted if all of the other materials are initially anhydrous. Also, other inert anhydrous solvent materials, such as acetonitrile, may be used instead of the anhydride.

The alkyl-substituted condensed ring aromatic compound is usually a solid at the temperatures involved, as is also the salt of the alkanoic acid. The acid itself and the acid anhydride are usually liquid and together comprise the solvent in which the other components are dissolved. If the anhydride is omitted, the acid alone comprises the solvent; in some cases the solvent may comprise the acid and an added component like acetonitrile. Whatever its composition, the solvent should have suitable solvent action and a suitable dielectric constant.

The composition of the solution to be electrolyzed, in relation to the liquid solvent, is as follows: the amount of aromatic compound is 20 to 500, preferably 100 to 300, g./l. of solvent; and the alkanoic acid salt ranges from 20 to 500, preferably 50 to 150, g./l. of solvent. The alkanoic acid may comprise 10 to 100%, preferably 40 to 60%, of the solvent, while the acid anhydride may comprise 90 to 0%, preferably 60 to 40%, of the solvent.

The current density may be maintained over a fairly wide range, say 0.001 to 0.5, and more preferably 0.01 to 0.26, amp/sq. cm. At higher values polyacyloxy derivatives tend to be favored, and mono derivatives at lower values. Generally, 0.09 to 0.10 amp/sq. cm. is suitable for mono and diacyloxy derivatives. As is known, the current density value determines the rate or speed of the electrolysis. Applied voltage is supplied by any suitable D.C. source.

The quantity of electricity passed through the solution in conveniently expressed in terms of faradays per mole of aromatic compound. For example, considering a reaction which involves a change of one electron, a faraday is defined as the amount of electricity which is required to convert one mole of the aromatic compound. In the present work, a faraday is considered to be the product of current and time, and one faraday is equal to 26.8 ampere hours. On this basis, the number of faradays may range from less than 0.5 up to about 11 or more per mole of aromatic compound. The faraday value determines the extent of substitution.

Room temperatures are preferred, e.g., 20 to 30° C., although higher temperatures are useful, going to the boiling point of the solution. The current efficiencies are in the range of 50 to 90%. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, or neutral, but preferably is on the acid side, and suitably may range from a pH of 4 to 6, more broadly from 2 to 7.

The preferred anodes are platinum, carbon, and lead dioxide, although other anodes are useful. The cathode may be carbon or graphite or any inert metal such as copper, stainless steel, platinum, silver, nickel lead, etc. Forms of the electrodes are conventional.

The product or products are formed at the anode by anodic oxidation. The anolyte may be distilled or fractionated to recover the product, or it may be worked up by crystallization techniques, but preferably the reaction mixture is first diluted with water and then subjected to conventional extraction with a conventional solvent such as ether. Thereafter the extract may suitably be separated by distillation or recrystallization procedures.

In general, by conducting the electrolysis until a minor fraction of the aromatic compound has been converted, it is found that the predominant product is the monoacyloxy derivative. Continuation of the electrolysis until half to three-fourths of the aromatic has been converted produces both the monoacyloxy and the diacyloxy derivatives both in good yield. Further progress of the electrolysis, using larger quantities of electricity, results in the formation of higher derivatives, including tri- and tetraacyloxy derivatives, in good yields. It is possible to produce substantially only the mono derivative, by initially converting only a minor fraction of the aromatic compound, then removing the formed mono product from the solution, continuing the conversion and removing mono product, and proceeding in this way until substantially all of the aromatic is converted to mono derivative.

It may be convenient to refer to the electrolysis of an illustrative material such as methylnaphthalene, and specifically to the acetoxylation thereof. At least four acetate groups can be successfully attached to the methylnaphthalene nucleus by anodic acetoxylation so that the resulting reaction mixture may comprise a mixture of the mono-, di-, tri-, and tetraacetoxy derivatives. The main determinant of the extent of substitution is the quantity of electricity passed through the solution.

In order to make monoacetoxy derivatives substantially free from higher derivatives, it is preferred to pass up to about 1.3 faradays of electricity through the solution, thereby converting at least about 40% by weight of the methylnaphthalene to a mono derivative. The latter is subtantially the only derivative formed and may comprise at least about 40% by weight of the total amount of methylnaphthalene-containing compounds present in the reaction mixture, the balance of such compounds comprising methylnaphthalene itself. At this point the electrolysis may be stopped, the derivative removed from the reaction mixture, while the unreacted naphthalene is put back into the solution and the electrolysis is continued. By repeating the foregoing steps, an ultimate yield of the mono derivative of about 90% by weight, based on methylnaphthalene, can be obtained. (By the expression "methylnaphthalene-containing compound" is meant a compound containing the condensed ring structure of methylnaphthalene and it includes both methylnaphthalene derivatives and unreacted methylnaphthalene.)

A mixture of mono and di derivatives is obtainable over a range of about 1.5 to 4.0 faradays. At 1.5 faradays the mixture is preponderantly mono, comprising about 50% mono, 10% di, and the balance unreacted methylnaphthalene. At about 3.0 faradays the proportions of mono and di are approximately equal. Thus, at least about 80% of the methylnaphthalene may be converted to produce up to about 40% each of mono and di derivatives. The concentration of di in the mixture is favored at 4.0 faradays.

The yield of the diacetate may be substantially increased by operating at 3.0 to 4.0 faradays to form a reaction mixture containing both mono and di derivatives, stopping the electrolysis to remove the diacetate, returning to the solution the unreacted methylnaphthalene and the mono derivative, and continuing the electrolysis until substantially all of the latter compounds are converted to diacetate.

Another method of forming the diacetate derivative is to use the mono derivative as the starting material. This procedure is simpler to the extent that methylnaphthalene is eliminated from the reaction mixture.

By increasing the amount of electricity, higher derivatives may be formed. Thus, by using about 6 to 11 faradays per mole of methylnaphthalene, at least up to 10% of tri- and tetraacetoxy derivatives may be formed, and such amounts may be increased as the conversion of starting material is increased. For example, if 90% of the methylnaphthalene is converted, mostly polyacetoxy derivatives are formed, with at least half, and more usually at least 60 or 70%, of the product comprising tri and tetra derivatives and most of the balance being a di derivative. If a monoacetoxy derivative is taken as starting compound, the quantity of electricity is usually about 2 faradays/mole less than the foregoing.

Another method of controlling the selectivity of the product comprises varying the alkali metal salt concentration. Thus, by keeping the concentration of sodium acetate at the lower portion of the concentration range, say about 20 g./l. of solvent, or even less, going down to 5 g./l. the formation of diacetate may be substantially suppressed in favor of the monoacetate. Conversely, the formation of the di derivative may be increased over the mono by keeping the sodium acetate concentration at the upper portion of the concentration range.

It may be noted that monoacetoxy methylnaphthalene is also termed methylnaphthyl acetate; diacetoxy methylnaphthalene is also methylnaphthalenediol diacetate; etc.

Other derivatives of methylnaphthalene that may be formed are the propionates, butyrates, isobutyrates, valerates, and caprylates. Usually the mono derivatives of the foregoing, with the substitution in the 1-position, are oily compounds at room temperatures, although substitution in the 2-position may produce several normally solid derivatives. The di derivatives are usually solid at room temperature, as are the higher derivatives. Acyloxy derivatives of other aromatics of the kind indicated may be prepared in the manner described for the acetoxylation of methylnaphthalene.

The invention may be illustrated by the following examples.

*Example 1*

Formation of a monoacetoxy derivative of 1-methylnaphthalene, with substantially no other product, was carried out by dissolving 70.1 g. of starting material and 16.4 g. of anhydrous sodium acetate in 220 ml. of a 1:1 mixture of glacial acetic acid and acetic anhydride. The charge was placed in a cell comprising a 3.0 cm. diameter glass cylinder of about 100 ml. capacity fitted with a reflux condenser, thermometer, magnetic stirrer, and two 1.5 x 3.6 cm. platinum foil electrodes mounted parallel and spaced 0.6 cm. apart. The mixture was electrolyzed with 1.3 faradays per mole of 1-methylnaphthalene (1.0 amp., 83 v., 50° C.). The resulting reaction mixture contained 79.5 g. of material which was found by gas chromatography to comprise about 60% of 1-methylnaphthalene and 40% of the monoacetate derivative thereof.

A fraction of this material (24.7 g., B.P. 143–147° C. at 2–3 mm.) was separated by distillation. From this liquid fraction, white crystals were separated (8.5 g., M.P. 86–88° C. after crystallization) which had the correct analysis for a methylnaphthyl acetate (found: 78.0% C, 6.25% H; calculated: 78.0% C., 6.0% H). Conventional alkaline hydrolysis of the crystals by refluxing the same in 5% aqueous KOH solution for one hour gave a material (M.P. 84–85° C.) having an infrared spectrum consistent with a methylnaphthol. As 4-methyl-1-naphthol has a M.P. of 84–85° C., it was clear that the monoacetate derivative formed in the electrolysis was 4-methyl-1-naphthyl acetate. Infrared spectra of the liquid fraction from which the crystals had been separated showed that it still contained some 4-methyl-1-naphthyl acetate.

*Example 2*

Mono and diacetoxy derivatives were prepared as follows. Using the cell of Example 1, and platinum electrodes, 70.0 g. of 2-methylnaphthalene and 36.0 g. of anhydrous potassium acetate were dissolved in 200 ml. of a 1:1 mixture of acetic acid and acetic anhydride and electrolyzed with 1.5 faradays (1.0 amp., 17 to 23 v., 68 to 73° C.). The product mixture was found to comprise 40% of unchanged 2-methylnaphthalene, 51% of monoacetate derivative, and 9% of diacetate derivative. By distillation a monoacetate fraction (29.6 g., B.P. 137–140° C. at 2 to 3 mm.) and an impure diacetate fraction were obtained.

Alkaline hydrolysis of the monoacetate fraction gave a mixture of two products in a 2:1 ratio from which two fractions were separated by elution chromatography on silica gel. Both fractions had infrared spectra consistent with a methylnaphthol structure. That corresponding to the major component had a M.P. of 65–66° after recrystallization, whereas 2-methyl-1-naphthol has a M.P. of 63–64° C., thus indicating the major amount of monoacetate to be 2-methyl-1-naphthyl acetate.

The impure diacetate fraction comprised 30% of a monoacetate. The fraction was purified further by chromatography, hydrolyzed in dilute acid to form naphthols, the latter oxidized with ferric chloride to convert some naphthols to quinones, and the resulting mixture sublimed to get a few milligrams of yellow material, M.P. 85–100° C., which had an infrared spectrum consistent with a methylnaphthoquinone. By comparison, 2-methyl-1,4-naphthoquinone has a M.P. of 104–105° C. This suggests that the diacetate is, at least in part, 2-methyl-1,4-naphthalenediol diacetate.

If desired, the anode may be rotated during the course of the electrolysis to secure good stirring, and if also desired it may be subjected to an ultrasonic field for the purpose of maintaining its surfaces free of any deposits. Oxygen is preferably excluded from the atmosphere over the solution being electrolyzed to avoid undesirable oxidation of reactants and products.

As indicated, in the acetoxylation reaction, the mixture of acetic acid and acetic anhydride is considered to function as a solvent for the other components of the solution and also for the various products of electrolysis. Another solvent that is useful is anhydrous acetonitrile, which may be used in the same amounts as the anhydride which it replaces. Another but less preferred solvent is dimethylformamide, which has suitable solvent properties but which leads to excessive methane and carbon dioxide formation, probably through reaction of the solvent. In general, any solvent or solvent mixture may be used, and in the amounts described, which dissolves the reactants and provides suitable conductivity, and which of course does not itself undergo reaction, i.e., has a sufficiently high oxidation potential as to be stable at the anode. Whatever solvent is employed, it is desirable to avoid the presence of water, which may undergo electrolysis and which usually results in darkly colored reaction mixtures.

It will be understood that the invention is capable of obvious variations without departing from its scope.

In the light of the foregoing description, the following is claimed:

1. Method for the electrochemical preparation of a monoacyloxy derivative of an alkyl-substituted condensed ring aromatic compound which comprises electrolyzing an anhydrous solution of said aromatic, an alkanoic acid, an alkali metal salt of an alkanoic acid, and an alkanoic acid anhydride by passing up to 1.3 faradays of electricity per mole of aromatic through said solution from an anode to a cathode to convert at least about 40% by weight of the aromatic to a monoacyloxy derivative, said derivative being substantially the only acyloxy derivative that is formed and comprising at least about 40% by weight of the total aromatic-containing compounds present with the balance of such compounds comprising the aromatic itself, then ceasing the electrolysis, and removing said derivative from the solution.

2. The method of claim 1 wherein, after said derivative is removed from the solution; the electrolysis is continued to convert unreacted aromatic, and wherein said derivative-removal step and said unreacted aromatic-conversion step are repeated to produce a yield of said derivative of about 90% by weight based on said aromatic.

3. Method for the electrochemical preparation of mono and diacyloxy derivatives of an alkyl-substituted condensed ring aromatic compound which comprises electrolyzing an anhydrous solution of said aromatic, an alkanoic acid, an alkali metal salt of an alkanoic acid, and an alkanoic acid anhydride by passing up to about 1.5 faradays of electricity per mole of aromatic through said solution from an anode to a cathode to produce a reaction mixture comprising at least 50% of said mono derivative, at least 10% of di derivative, and the balance unchanged aromatic, said concentrations being based on the weight of the total aromatic-containing compounds present, then ceasing the electrolysis, and removing said derivatives from the solution.

4. Method for the electrochemical preparation of mono- and diacyloxy derivatives of an alkyl-substituted condensed ring aromatic which comprises electrolyzing an anhydrous solution of said aromatic, an alkanoic acid, an alkali metal salt of an alkanoic acid, and an alkanoic acid anhydride by passing up to about 3.0 faradays of electricity per mole of aromatic through said solution from an anode to a cathode to convert at least about 80% by weight of the aromatic to acyloxy derivatives comprising at least about 40% each of said mono and di derivatives based on the weight of the total aromatic-containing compounds present, then ceasing the electrolysis, and removing said derivatives from the solution.

5. Method for the electrochemical preparation of mono and diacyloxy derivatives of an alkyl-substituted condensed ring aromatic compound which comprises electrolyzing an anhydrous solution of said aromatic, an alkanoic acid, an alkali metal salt of an alkanoic acid, and an alkanoic acid anhydride by passing about 1.5 to 4.0 faradays of electricity per mole of aromatic through said solution from an anode to a cathode to convert said aromatic compound to said mono and di derivatives, then ceasing the electrolysis, and removing said derivatives from the solution.

6. Method for the electrochemical preparation of a diacyloxy derivative of an alkyl-substituted condensed ring aromatic which comprises electrolyzing an anhydrous solution of said aromatic, an alkanoic acid, an alkali metal salt of an alkanoic acid, and an alkanoic acid anhydride by passing 3.0 to 4.0 faradays of electricity per mole of aromatic through said solution from an anode to a cathode to convert at least a portion of the aromatic to mono and diacyloxy derivatives, then ceasing the electrolysis, removing said di derivative from the solution, continuing the electrolysis to convert the mono derivative and unreacted aromatic, and repeating the foregoing steps to convert substantially all of said aromatic to a di derivative.

7. Method for the electrochemical preparation of polyacyloxy derivatives of an alkyl-substituted condensed ring aromatic which comprises electrolyzing an anhydrous solution of said aromatic, an alkanoic acid, an alkali metal salt of an alkanoic acid, and an alkanoic acid anhydride by passing about 6 to 11 faradays of electricity per mole of aromatic through said solution from an anode to a cathode to convert at least about 90% by weight of the aromatic to polyacyloxy derivatives, said derivatives comprising at least 20% by weight of diacyloxy derivative and at least 50% by weight of tri- and tetraacyloxy derivatives based on the total aromatic-containing compounds present, then ceasing the electrolysis, and removing said derivatives from the solution.

8. Method for the electrochemical preparation of polyacyloxy derivatives of an alkyl-substituted condensed ring aromatic compound which comprises electrolyzing an anhydrous solution comprising a monoacyloxy derivative of said aromatic compound, an alkanoic acid, and an alkali metal salt and an anhydride of said acid by passing at least about 1.5 faradays of electricity per mole of said monoacyloxy derivative through said solution from an anode to a cathode to convert at least about 90% by weight of said derivative to polyacyloxy derivatives, said derivatives comprising at least 20% by weight of diacyloxy derivatives and at least 50% by weight of tri and tetraacyloxy derivatives, then ceasing the electrolysis, and removing said derivatives from the solution.

9. Method for the electrochemical preparation of an acyloxy derivative of an alkyl-substituted condensed ring aromatic compound in good yield which comprises preparing an anhydrous solution of said aromatic compound and a salt of an alkanoic acid in a solvent comprising an alkanoic acid, passing through the solution 0.5 to 11 faradays of electricity per mole of aromatic compound, thereby to form an acyloxy derivative of said aromatic compound, continuing to pass current until up to about 25% by weight of said aromatic compound has been converted to said derivative, and recovering the latter.

10. Method of claim 9 wherein said alkanoic acid has 2 to 6 carbon atoms.

11. Method of claim 9 wherein said salt is the salt of said acid.

12. Method of claim 9 wherein said aromatic compound is a methylnaphthalene, said alkanoic acid is acetic acid, and said salt is an alkali metal acetate.

13. Method for the electrochemical preparation of an acyloxy derivative of an alkyl-substituted condensed ring aromatic compound in good yield which comprises preparing an anhydrous solution comprising, per liter of a solvent comprising an alkanoic acid, 20 to 500 g. of said aromatic compound and 20 to 500 g., of an alkali metal salt of said alkanoic acid, passing current through said solution from an anode to a cathode at a current density of 0.001 to 0.5 amp/sq. cm., thereby to form an acyloxy derivative of said aromatic compound, continuing to pass current until at least about 25% by weight of said aromatic compound has been converted to said derivative, and recovering the latter.

14. Method of claim 13 wherein said solvent comprises a mixture of said alkanoic acid and an anhydride of said acid.

15. Method of claim 14 wherein said anhydride is the anhydride of said acid and said salt is the salt of said acid.

16. Method of claim 14 wherein said aromatic compound is a methylnaphthalene, said alkanoic acid is acetic acid, said salt is an alkali metal acetate, and said anhydride is acetic anhydride.

17. Method of claim 13 wherein said alkanoic acid has 2 to 6 carbon atoms.

No references cited.

JOHN H. MACK, *Primary Examiner.*